(12) United States Patent
Kawakami

(10) Patent No.: US 7,894,624 B2
(45) Date of Patent: Feb. 22, 2011

(54) IMAGE PROCESSING METHOD

(75) Inventor: Haruko Kawakami, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1279 days.

(21) Appl. No.: 11/474,185

(22) Filed: Jun. 23, 2006

(65) Prior Publication Data

US 2007/0297642 A1    Dec. 27, 2007

(51) Int. Cl.
G06K 9/00 (2006.01)

(52) U.S. Cl. .................... 382/100; 382/232; 382/233; 382/240; 380/51; 380/52; 713/176; 713/179

(58) Field of Classification Search .......... 382/100, 382/232, 233, 240; 380/51, 52, 201, 210, 380/287; 713/176, 179; 358/1.9, 3.28; 348/461, 348/463
See application file for complete search history.

(56) References Cited

U.S. PATENT DOCUMENTS

| 5,652,626 | A | 7/1997 | Kawakami et al. |
| 7,505,179 | B2 * | 3/2009 | Matsunoshita et al. ..... 358/3.28 |
| 7,593,542 | B2 * | 9/2009 | Abe et al. ................. 382/100 |
| 2003/0179399 | A1 * | 9/2003 | Matsunoshita ............. 358/1.13 |
| 2005/0018903 | A1 * | 1/2005 | Miyagi et al. ............... 382/167 |
| 2005/0207613 | A1 | 9/2005 | Kawakami et al. |
| 2007/0127771 | A1 * | 6/2007 | Kaneda et al. .............. 382/100 |

FOREIGN PATENT DOCUMENTS

JP    2004-221773    8/2004

* cited by examiner

Primary Examiner—Samir A Ahmed
Assistant Examiner—Ali Bayat
(74) Attorney, Agent, or Firm—Turocy & Watson, LLP

(57) ABSTRACT

The main CPU executes Fourier transform to the partial image, then performs strict spectrum analysis 1 for judging the presence/absence of data at a coordinate position designated in advance on a Fourier transform plane with high resolution for judging the presence/absence of prohibition of duplication, then judges whether duplication-prohibited data exists or not, and clears both the partial image and the document image if it is judged that duplication-prohibited data exists. If it is judged that duplication-prohibited data does not exist, the main CPU executes spectrum analysis 2 for broadly inspecting the existence of a periodic component instead of lowering the resolution from the spectrum analysis 1 and judges whether a structure other than DC component exists or not. If the existence of a minute quantity of change that could not exist in a normal image is recognized, the main CPU performs partial image processing such as amplifying the quantity of change, then superimposes it onto the document image, and supplies the image on which the superimposing processing has been executed, to an output unit and a liquid crystal display unit, thus outputting or displaying the image.

10 Claims, 5 Drawing Sheets

IMAGE PROCESSING METHOD

BACKGROUND OF THE INVENTION

1. Field of the Invention

This invention relates to an image processing method for an image processing apparatus that reads an image of a manuscript and processes the read image of the manuscript.

2. Description of the Related Art

A technique of embedding a watermark or the like in advance into a document image the duplication of which is not permitted, and thus prohibiting the duplication of the image itself, or a technique of embedding data related to the contents of a document and thus preventing falsification of the data and the contents of the document of the corresponding part, is becoming generally popularized.

However, though a method of embedding information of copyright owner and prohibition of duplication into a part that constitutes an entire target image for copyright protection and thus limiting changes and downloading of a file is employed mainly with respect to soft copies in network distribution, for an image that is very likely to be misused after duplication such as a stamp or sign that is additionally written after making a hard copy, it is difficult to embed data indicating prohibition of duplication into the image in advance.

As described above, stamps and signatures vary in shape and size, and detection of them is difficult by using a method like pattern matching. Also, unless a target image is changed to a predetermined color in printing from a monochrome read image, or unless an image is recorded after its original image is magnified at an extremely large or small magnification, an image equivalent to the target image can be acquired by magnifying again to the size of the original image. Therefore, compared with other specific images, duplication and use of them can be easily carried out. Thus, there is a problem that the possibility of misuse is high.

BRIEF SUMMARY OF THE INVENTION

The object of an aspect of the present invention is to provide an image processing method for an image processing apparatus that enables detection of an image of a stamp, sign or the like, in which information cannot be embedded because its detection is difficult and it is often additionally written later, and thus enables prevention of misuse after slicing and duplication.

According to an aspect of the present invention, there is provided an image processing method for an image processing apparatus configured to perform predetermined processing to document image data and supply the processed document image data to an output unit or a storage unit, comprising the step of: performing embedding processing of data expressed by a minute change in value of a pixel with respect to a preset area, when expanding the document image data to bit map data.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

Hereinafter, an embodiment of this invention will be described with reference to the drawings.

Figure 1:
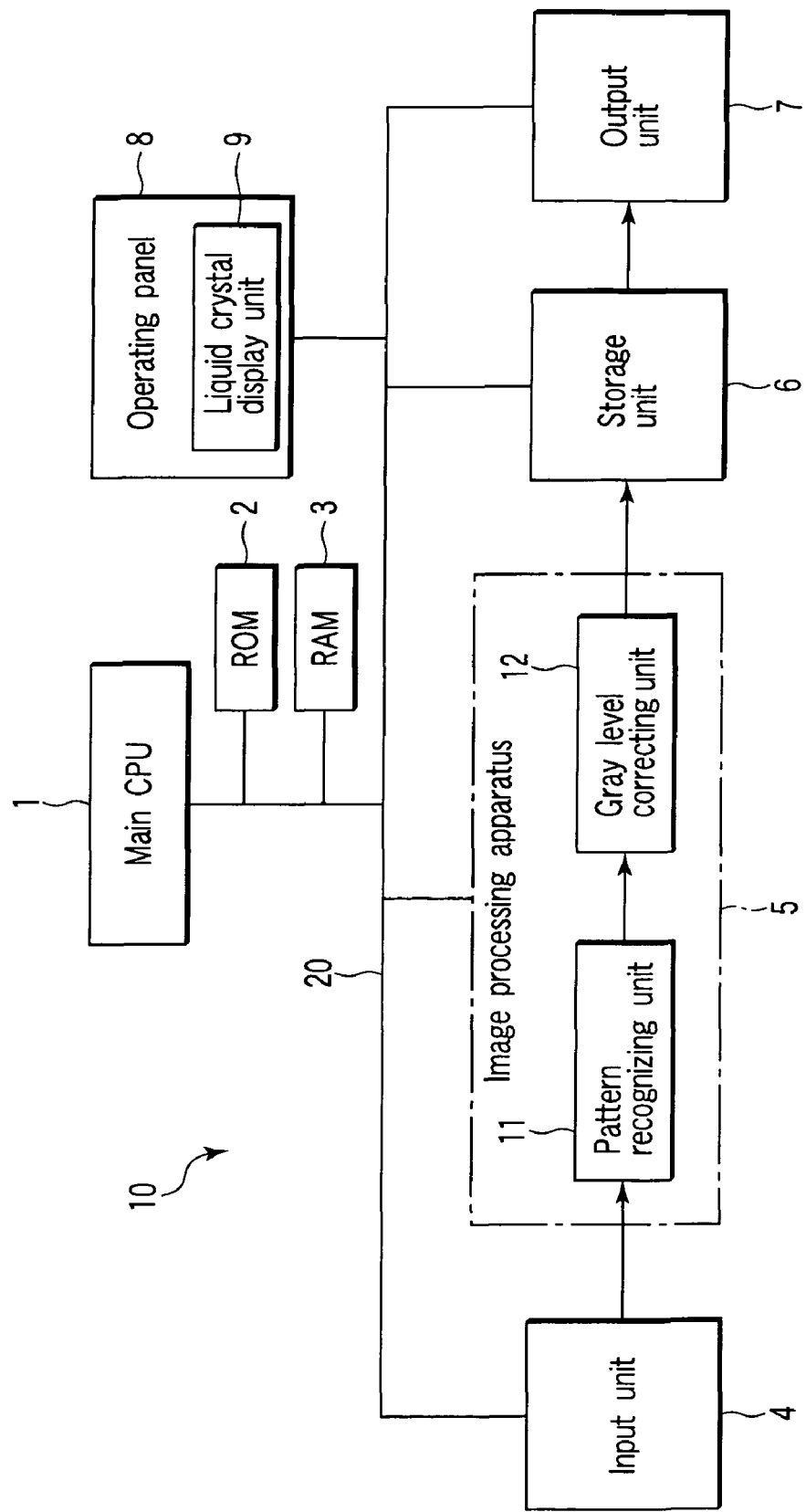
FIG. 1 is a block diagram showing a schematic configuration of a multifunction peripheral having an image processing apparatus of this invention.

FIG. 1 shows a schematic configuration of a multi function peripheral (hereinafter described as MFP) 10 having an image processing apparatus of this invention.

As shown in FIG. 1, the MFP 10 includes a main CPU 1, a ROM 2, a RAM 3, an input unit 4, an image processing apparatus 5, a storage unit 6, an output unit 7, and an operating panel 8. The foregoing constituent elements are connected via a bus 20 with the main CPU 1 situated at the center.

The main CPU 1 is in charge of the overall operations of the MFP 10 and operates in accordance with programs stored in advance in the ROM 2.

The RAM 3 stores image data or various types of information.

The input unit 4 optically scans a manuscript and changes the manuscript to image data.

The image processing apparatus 5 has a pattern recognizing unit 11 and a gray level correcting unit 12, and performing various types of processing to image data. The pattern recognizing unit 11 performs pattern recognition for judging duplication-prohibited image data or the like. The gray level correcting unit 12 corrects the gray level of image data.

The storage unit 6 is formed by a hard disk device or the like and stores image data or various types of information.

The output unit 7 prints image data or the like onto a paper.

The operating panel 8 has a display that is formed by a liquid crystal display unit 9 with a built-in touch panel, and plural hard keys. In this operating panel 8, various operations in the MFP 10 are carried out by using the plural hard keys and the liquid crystal display unit 9 with the built-in touch panel.

Next, the outline of this invention in such a configuration will be described.

Figure 2:
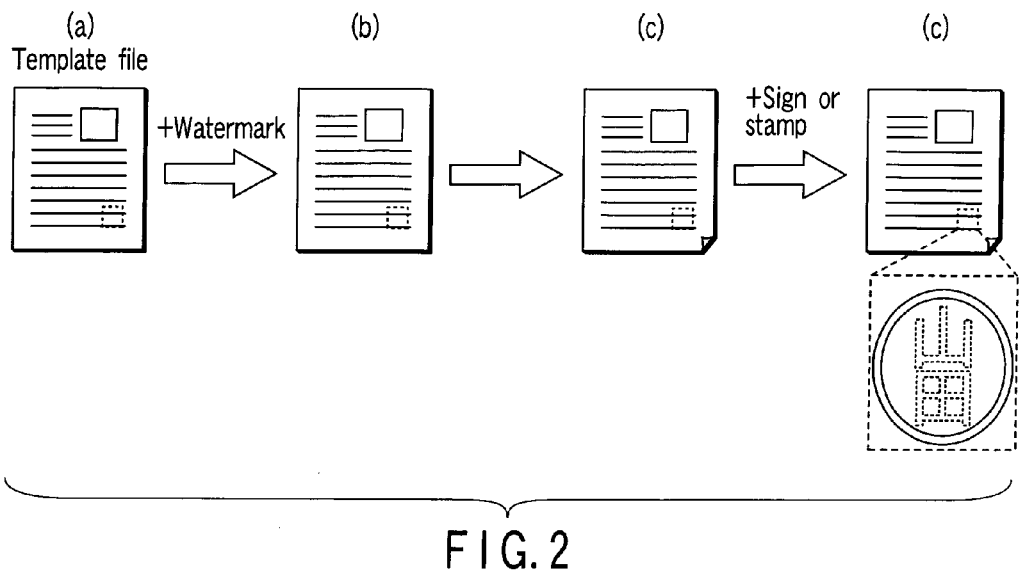
FIG. 2 is a view for explaining an embedding operation in an image processing method according to a first embodiment.

FIG. 2 illustrates embedding in the image processing method according to the first embodiment. As shown in FIG. 2, first, a document file (template file) formed by complementing a template or text of a document image having a duplication-prohibited part by using document processing software is inputted from the input unit 4 (a). Next, a duplication-prohibited area (indicated by a dotted line in FIG. 2) of the template file or document file is designated in advance, and a minute change that can be hardly visually recognized is made in the area, thus embedding information indicating prohibition of duplication from the image processing apparatus 5 (b). The document image to which the embedding processing has been done is outputted as a hard copy via the storage unit 6 and the output unit 7, and a sign or stamp is additionally written in the corresponding part where the data indicating prohibition of duplication has been embedded (c, d).

Figure 3:
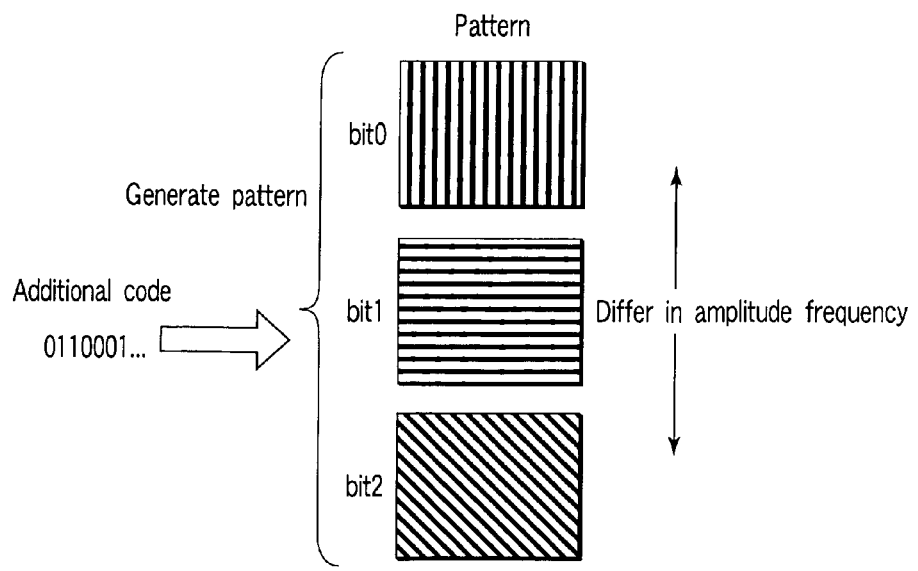
FIG. 3 is a view for explaining the details of embedding to an image.

FIG. 3 shows an exemplary pattern in the case where this data indicating prohibition of duplication is embedded as a periodic component. If the voltage of embedded data is plural bits, data modulation of plural types of periodic components having difference periods and angles as shown in FIG. 3 is superimposed on a signal value of the original image, and a signal value d after superimposing the data on the original signal value d0 is acquired by the following equation.

$$d = d0 + \sum_{n=1}^{bn} WAn * \cos(\cos(W\theta n) \times 2i\pi / WLn + \sin(W\theta n) \times 2j\pi / WLn)$$

Here, bn represents the number of bits of data to be superimposed. WAn represents the amplitude of the periodic component. W$\theta$n represents the angle formed with the main scanning direction of the period component. WLn represents the period, and i, j represent a position of a target point in the main scanning direction and sub scanning direction.

In this manner, additional writing can be carried out by making a change representing information of prohibition of duplication or the like in a target area in advance, and even an image in which a target partial image has largely varied color and shape so that detection of this image part is difficult, can be a subject for prohibition of duplication.

Regardless of whether duplication is permitted or not, the additional data may include the date of creation, distribution range, degree of confidentiality and the like.

Figure 4:
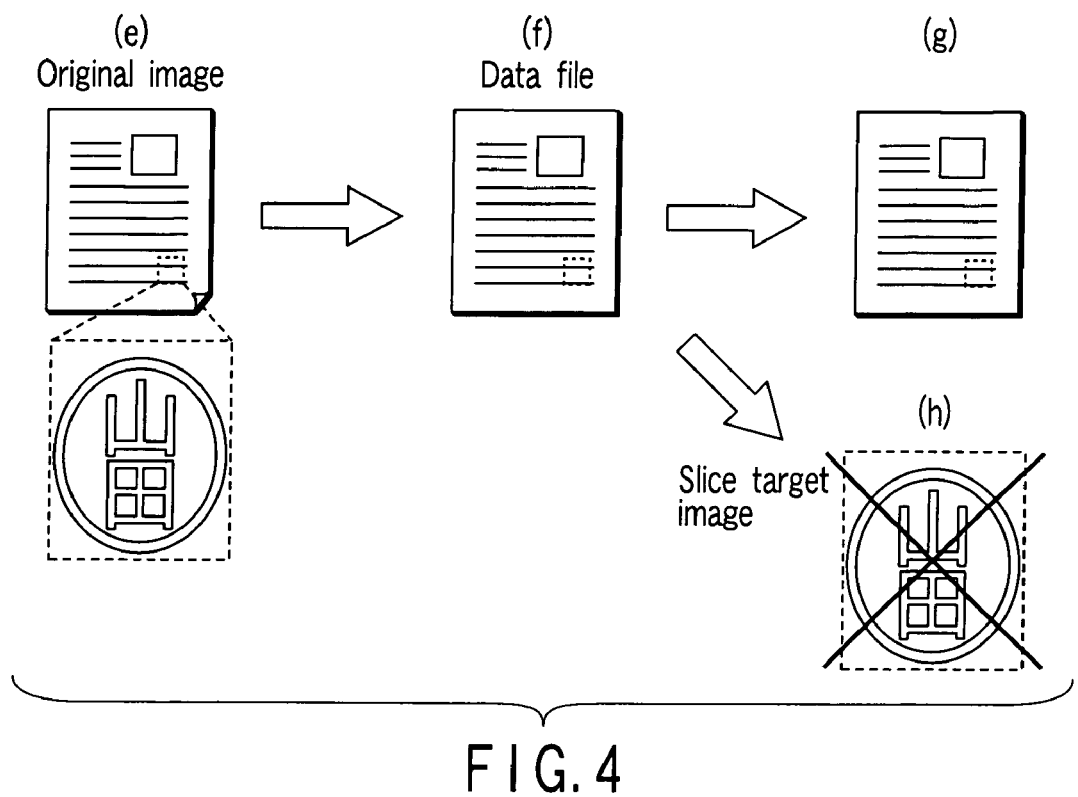
FIG. 4 is a view for explaining an operation at the time of reading in the image processing method.

FIG. 4 shows an operation at the time of reading. An image formed by superimposing a sign or stamp to be a subject for prohibition of duplication onto an area where data has been embedded, is read by the input unit 4 (e), and the target image is taken in as a data file (f). Also a scanner, copy machine or digital camera may be used.

In the case of trying to slice out and save the target part where the data of prohibition of duplication has been embedded, of the image taken in as a data file, if the image processing apparatus 5 that executes the slicing of the image can detect the data embedded in this image area, the main CPU 1 compares the extracted data with the data stored in the storage unit 6 that is directly connected with the judgment, and executes judgment on whether the data is a subject for prohibition of duplication or the like.

Figure 5:
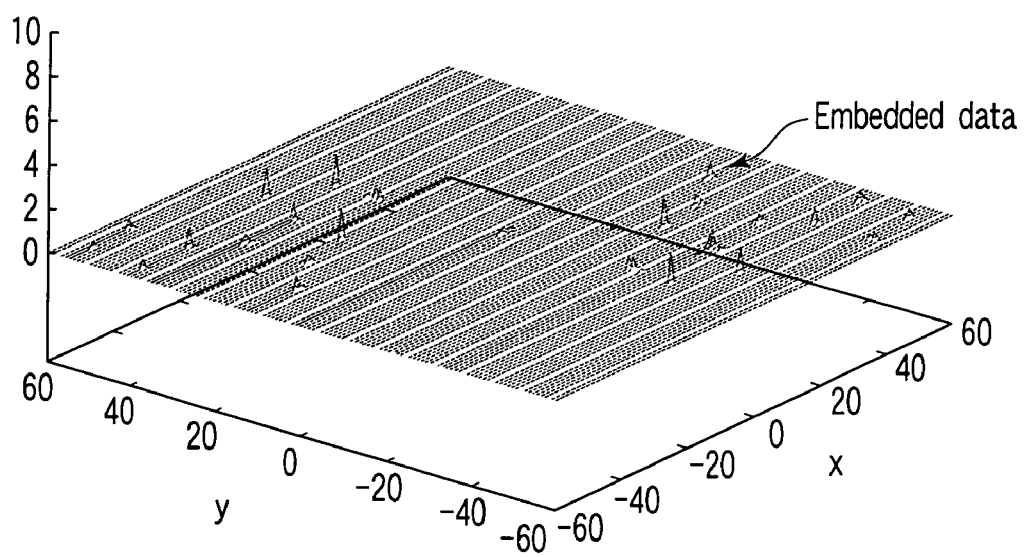
FIG. 5 is a view showing a spectral arrangement on a Fourier transform plane.

In the case where the technique of superimposing plural periodic components as described above is employed for embedding here, when Fourier transform is executed, peaks in spectral value of angle and frequency of the embedded periodic components can be confirmed on a frequency surface, as shown in FIG. 5. This spectral value of the target angle and frequency is compared with a predetermined threshold value and then on/off of the bit is judged, thus detecting the embedded data. If the target part is judged to be duplication-prohibited in the stage where this data is detected, the setting is made so that execution of slicing or additional saving of the sliced part will be stopped. Also, a warning may be issued that indicates prohibition of duplication.

If the image processing apparatus 5 cannot be detect the data, as in the case where it cannot confirm the existence of the data by comparing with the periodic component stored in the storage unit 6 in advance other than the original image, the input image is saved at least without causing degradation of the partial image of the input image (g), and duplication can be prevented when the sliced partial image is reused (h).

Figure 6:
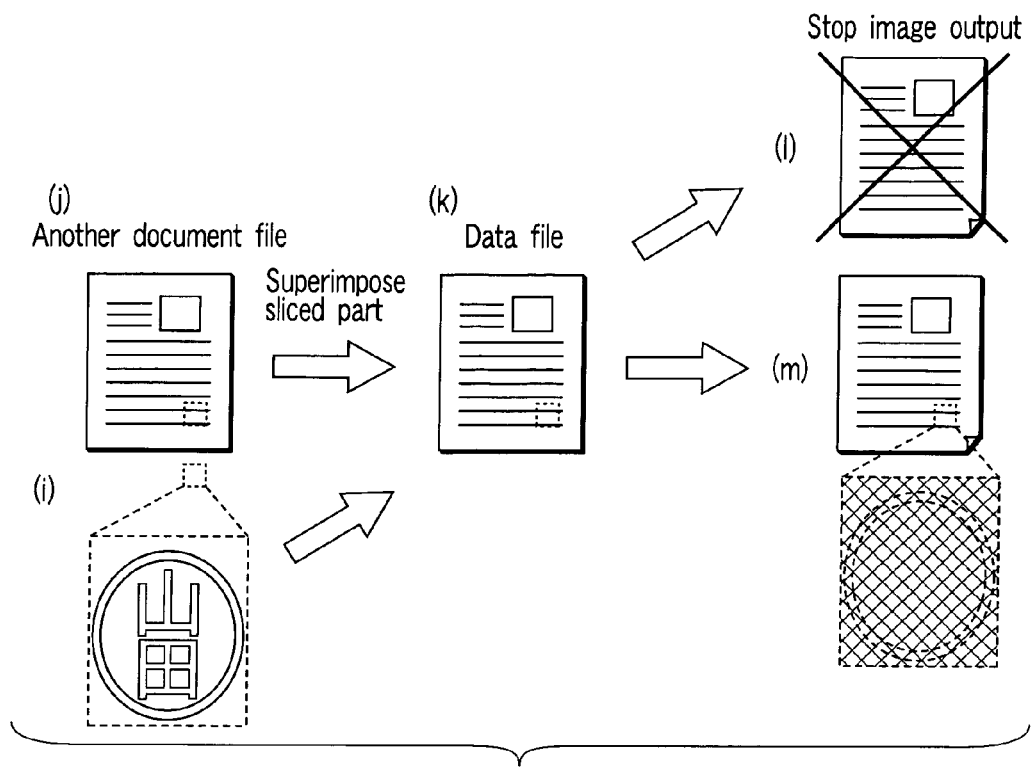
FIG. 6 is a view for explaining image superimposing processing according to the first embodiment.

FIG. 6 shows a process related to overlay processing in the case where the slicing or saving of a target part of an image according to the first embodiment is executed in another image processing system and then provided. When (k) superimposing a sliced partial image (i) on another document file (j), if information of prohibition of duplication is recognized in the partial image, the superimposed image itself is stopped (l). If data of prohibition of duplication is not recognized but the existence of a minute quantity of change which could not exist in a normal image is recognized, the minute change is emphasized and then superimposed on a document image that is an overlay target (m).

Figure 7:
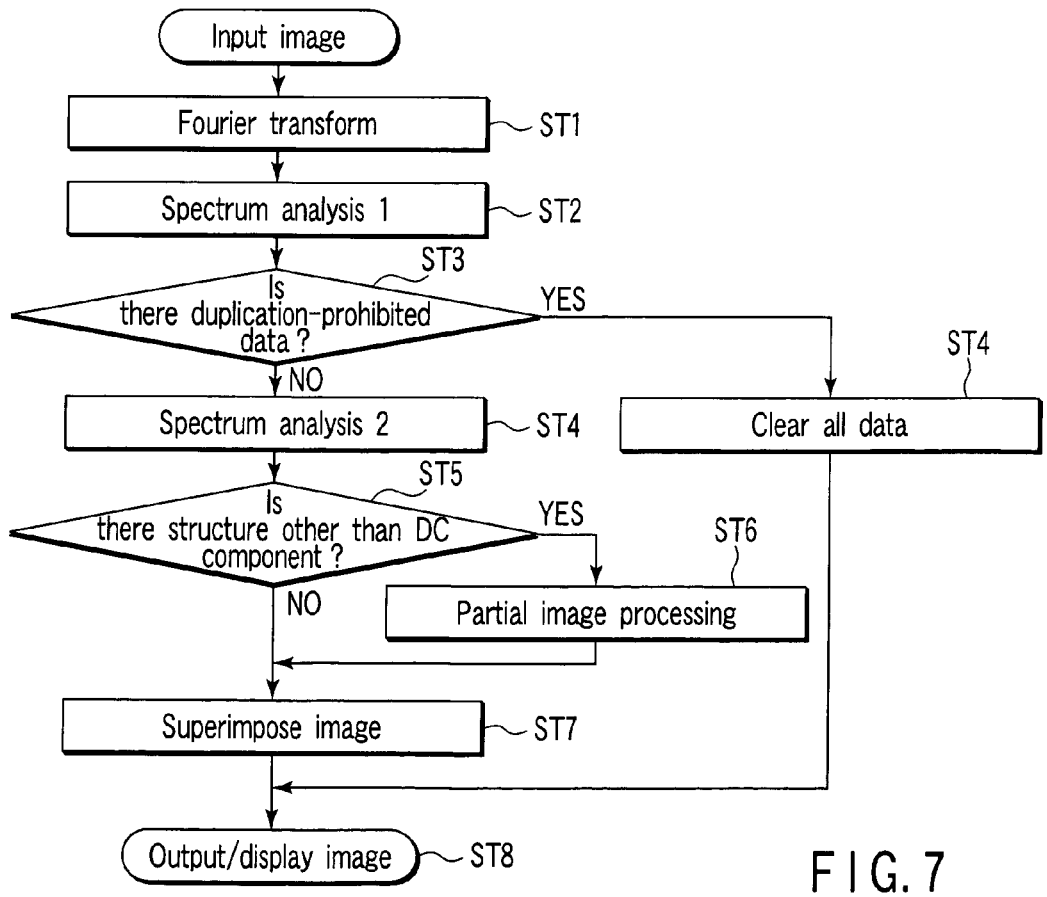
FIG. 7 is a flowchart for explaining operations of the image superimposing processing.

Next, the above-described image processing according to the first embodiment will be described with reference to the flowchart of FIG. 7.

The main CPU 1 first executes Fourier transform to the partial image (ST1), then performs strict spectrum analysis 1 for judging the presence/absence of data at a coordinate position designated in advance on a Fourier transform plane with high resolution for judging the presence/absence of prohibition of duplication (ST2), and judges whether duplication-prohibited data exists or not (ST3). If it is judged that duplication-prohibited data exists, the main CPU 1 clears both the partial image and the document image (ST4).

If it is judged in step ST3 that duplication-prohibited data does not exist, the main CPU 1 executes spectrum analysis 2 for broadly inspecting the existence of a periodic component instead of lowering the resolution from the spectrum analysis 1 (ST4) and judges whether a structure other than DC component exists or not (ST5).

If the existence of a minute quantity of change that could not exist in a normal image is recognized, the main CPU 1 performs partial image processing such as amplifying the quantity of change and then superimposes it onto the document image (ST6, 7). The main CPU 1 supplies the image on which the superimposing processing has been executed, to the output unit 7 and the liquid crystal display unit 9, thus outputting or displaying the image (ST8).

As described above, according to the first embodiment, in the case where there is an image that is very likely to be misused as it is sliced out, duplicated and superimposed on another document image, the misuse can be prevented by performing the above-described processing.

Next, a second embodiment will be described.

Figure 8:
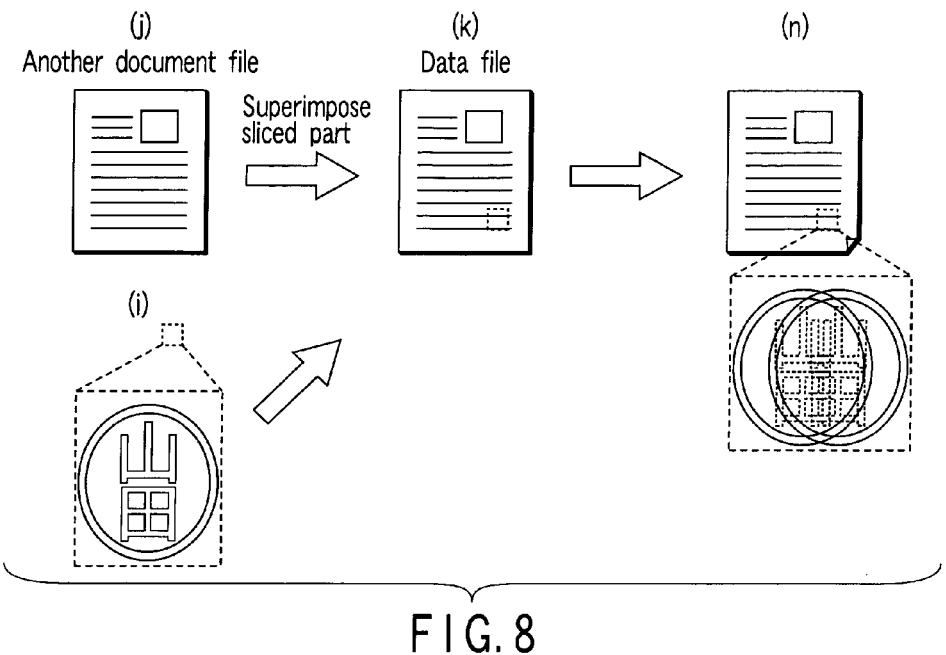
FIG. 8 is a view for explaining image superimposing processing according to a second embodiment.

In the above-described first embodiment, if the existence of data indicating prohibition of duplication is recognized, the processing is carried out so as not to perform output or display itself, whereas the main CPU 1 in this second embodiment changes the partial image into a non-reusable shape by doubly superimposing the partial image (n) as shown in FIG. 8, or otherwise, and thus performs control to prevent misuse of the image.

Next, a third embodiment will be described.

Figure 9:
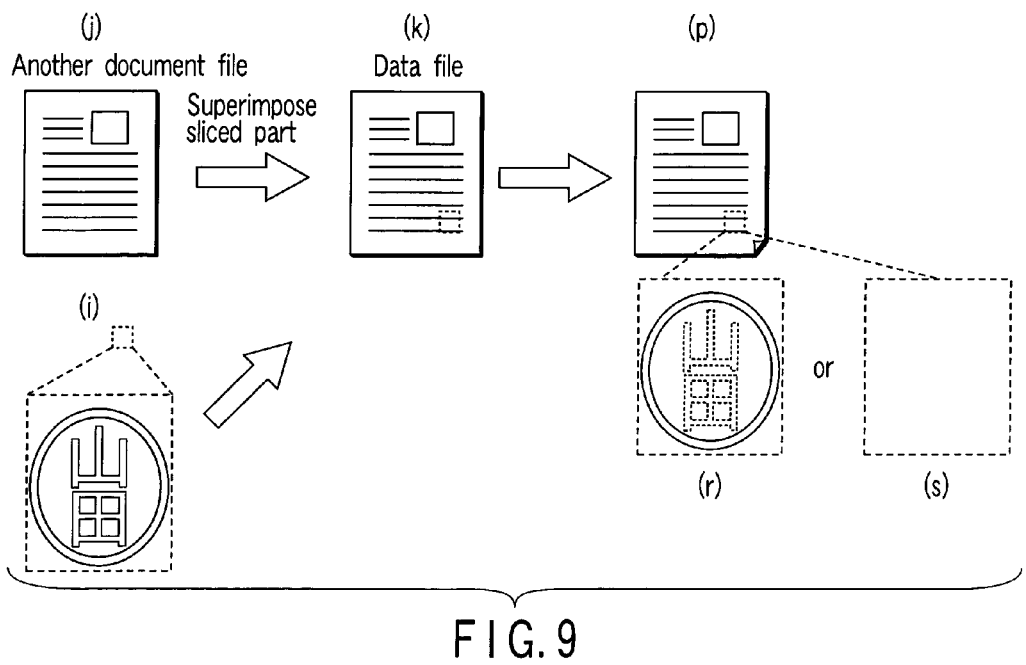
FIG. 9 is a view for explaining image superimposing processing according to a third embodiment.

The main CPU 1 in the third embodiment makes a change such as erasing a part of color channels from the partial image (s) or arranging the partial image in one channel of monochrome alone (r) as shown in FIG. 9, and thus performs control to prevent misuse of the image.

As described above, according to the embodiments of the invention, with the above-described configuration, data indicating prohibition of duplication is embedded in advance into a part where a predetermined image is additionally written, in a document image, thereby enabling superimposition of information even for target images having various shapes and sizes. Also, even for an image that has largely varied shape and size and that cannot be dealt with by an ordinary detecting method, slicing processing can be prevented. Even for an image that has been sliced out because it was not found in the detection, the image is detected when it is superimposed on another document, and a change is made in the sliced image or its output or display is stopped, thereby enabling prevention of misuse.

Moreover, even when it cannot be judged that the image is duplication-prohibited because the system that embedded the information is different, a minute change that is different from a normal document image is detected and the change is emphasized, thereby enabling prevention of misuse of the sliced image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method for an image processing apparatus configured to perform predetermined processing to document image data and supply the processed document image data to an output unit or a storage unit, comprising:
   performing embedding processing of data expressed by a minute change in value of a pixel with respect to a preset area, when expanding the document image data to bit map data, wherein the preset area is a stamp section or sign section and is an area having an image that is very likely to be duplicated, sliced out and reused as a single image.

2. The method of claim 1, wherein the data expressed by a minute change in value of a pixel indicates prohibition of duplication of partial image data at least in a target area.

3. The method of claim 1, wherein the data expressed by a minute change in value of a pixel includes one or more of the date of creation, distribution range, and degree of confidentiality.

4. The method of claim 1, wherein the data expressed by a minute change in value of a pixel includes one or more of the date of creation, distribution range, and degree of confidentiality.

5. An image processing method for an image processing apparatus configured to perform predetermined processing to document image data and supply the processed document image data to an output unit or a storage unit, comprising:
   performing embedding processing of data expressed by a minute change in value of a pixel with respect to a preset area, when expanding the document image data to bit map data, wherein if it is recognized that the data embedded in the document image data or electronic document data indicates prohibition of duplication, execution of slicing of image data of the duplication-prohibited part is stopped.

6. An image processing method for an image processing apparatus configured to perform predetermined processing to document image data and supply the processed document image data to an output unit or a storage unit, comprising:
   performing embedding processing of data expressed by a minute change in value of a pixel with respect to a preset area, when expanding the document image data to bit map data, wherein if it is recognized that the data embedded in the document image data or electronic document data indicates prohibition of duplication, a warning is issued and storing to the storage unit is stopped when image data of the duplication-prohibited part is sliced out and saved into the storage unit.

7. An image processing method for an image processing apparatus configured to expand and process electronic document data provided in a predetermined format to bit map data and supply the bit map data to an output unit or a storage unit, comprising:
   performing embedding processing of data expressed by a minute change in value of a pixel with respect to a preset area, when expanding the document image data to bit map data, wherein the preset area is a stamp section or sign section and is an area having an image that is very likely to be duplicated, sliced out and reused as a single image.

8. The method of claim 7, wherein the data expressed by a minute change in value of a pixel indicates prohibition of duplication of partial image data at least in a target area.

9. An image processing method for an image processing apparatus configured to expand and process electronic document data provided in a predetermined format to bit map data and supply the bit map data to an output unit or a storage unit, comprising:
   performing embedding processing of data expressed by a minute change in value of a pixel with respect to a preset area, when expanding the document image data to bit map data, wherein if it is recognized that the data embedded in the document image data or electronic document data indicates prohibition of duplication, execution of slicing of image data of the duplication-prohibited part is stopped.

10. An image processing method for an image processing apparatus configured to expand and process electronic document data provided in a predetermined format to bit map data and supply the bit map data to an output unit or a storage unit, comprising:
    performing embedding processing of data expressed by a minute change in value of a pixel with respect to a preset area, when expanding the document image data to bit map data, wherein if it is recognized that the data embedded in the document image data or electronic document data indicates prohibition of duplication, a warning is issued and storing to the storage unit is stopped when image data of the duplication-prohibited part is sliced out and saved into the storage unit.

* * * * *